Figure 1:
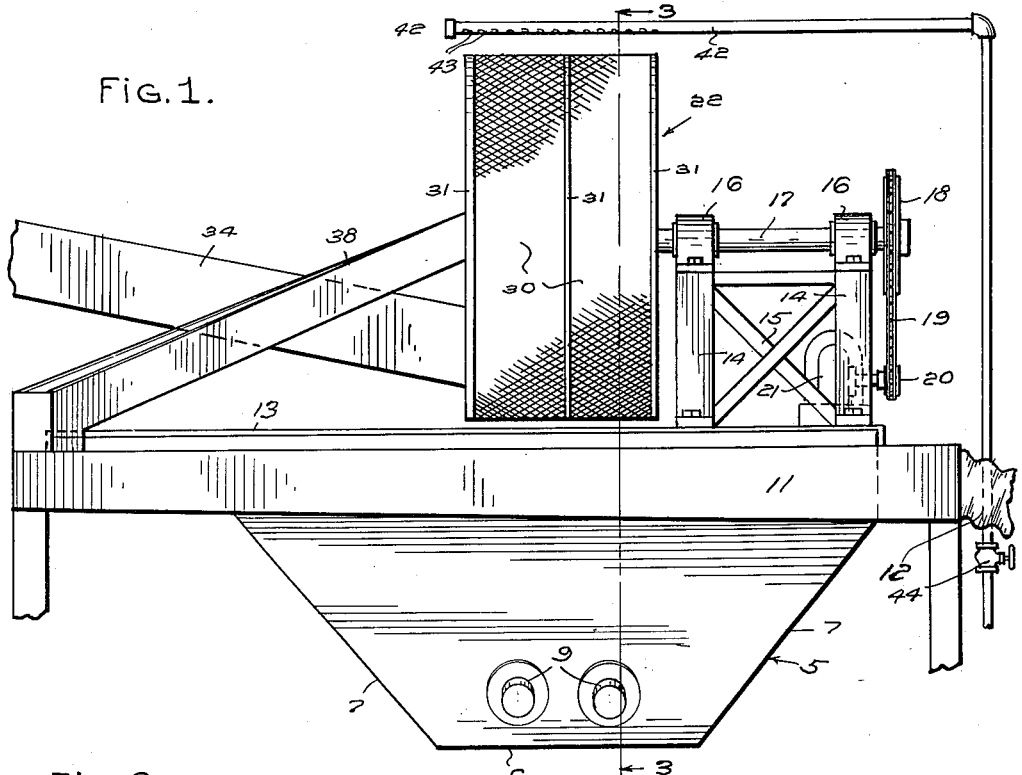

March 11, 1952 G. W. TRUNDLE 2,588,592
ROTARY HYDRAULIC SEPARATOR
Filed Sept. 6, 1949 3 Sheets-Sheet 1

INVENTOR.
GRANT W. TRUNDLE,
BY
ATTORNEY.

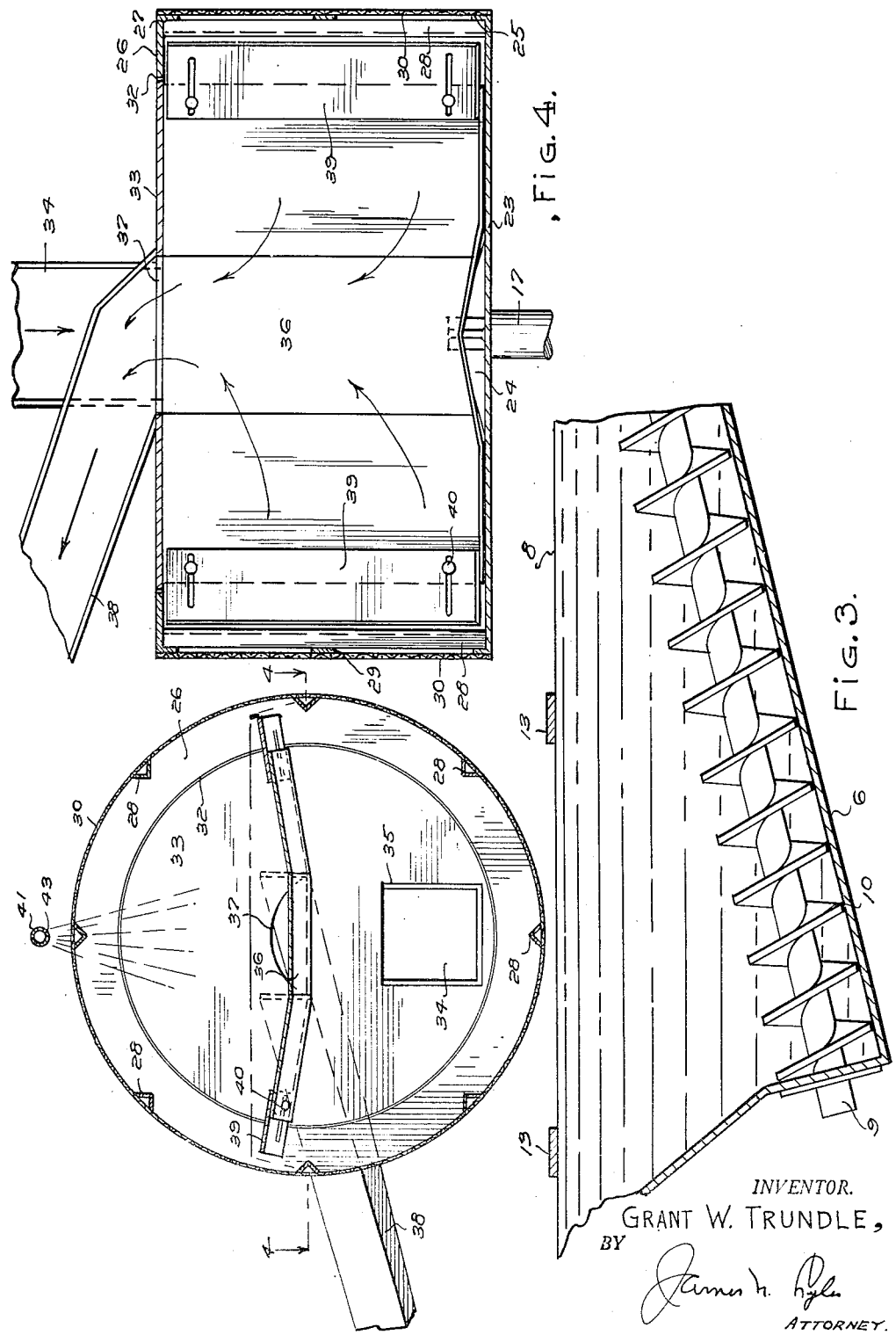

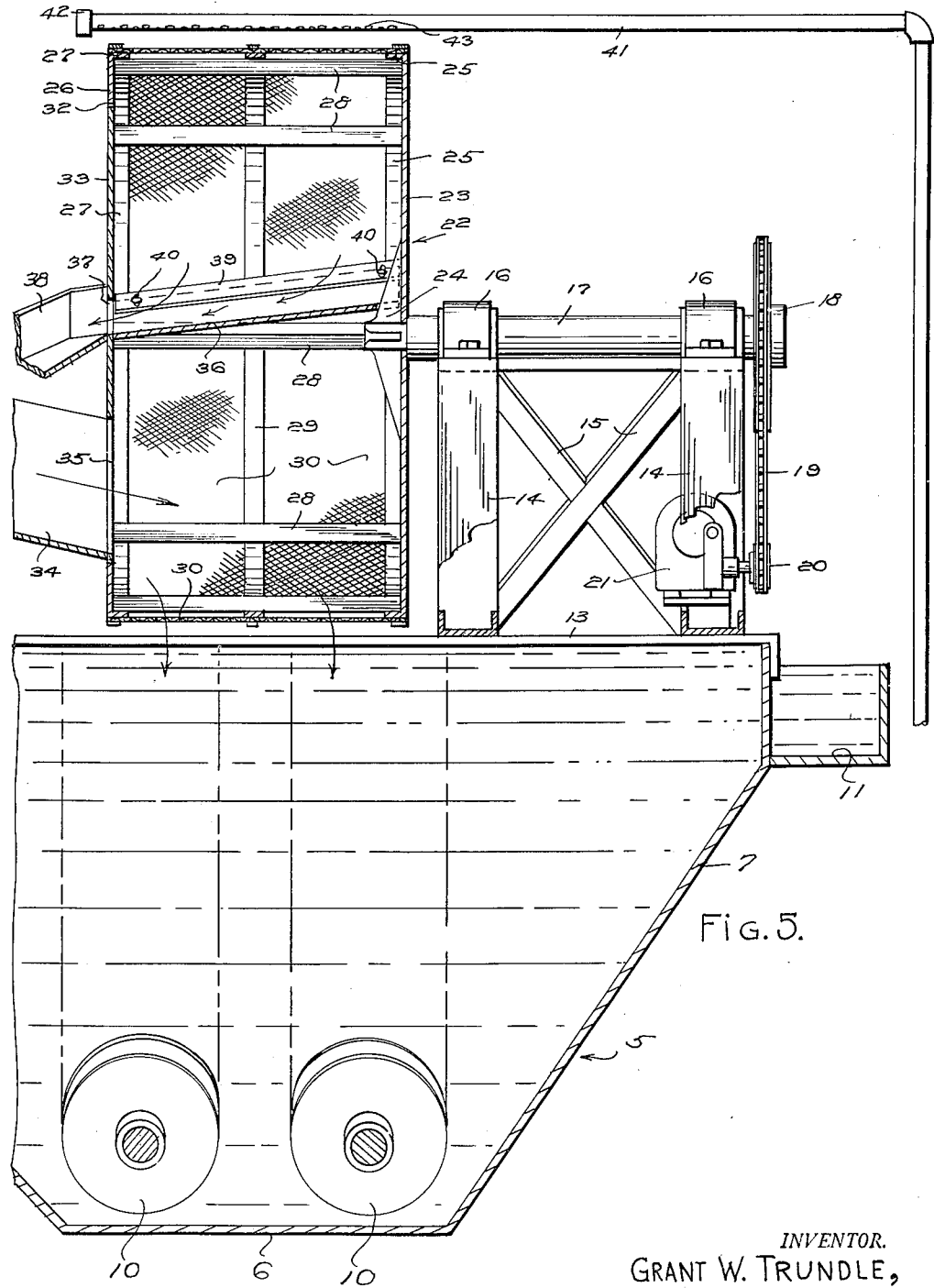

Patented Mar. 11, 1952

2,588,592

UNITED STATES PATENT OFFICE 2,588,592

ROTARY HYDRAULIC SEPARATOR

Grant W. Trundle, Fort Lauderdale, Fla.

Application September 6, 1949, Serial No. 114,186

3 Claims. (Cl. 209—270)

1

This invention relates to improvements in separators and has particular reference to separators of the hydraulic type for the separation of sand from courser particles for providing what is commonly recognized as mason's sand.

Many attempts have heretofore been made to separate a grade of sand for use in masonry construction that was free or substantially free from undesirable aggregates that, as a result required a final screening by the mechanic or his helper in preparing his mortar. This final screening obviously entailed a considerable unnecessary expense to the contractor and the purpose of the present invention is to completely separate all particles not capable of passing through a number eight screen, or other suitable size, conveying the undesirable particles to a remote point for disposal, while permitting the separated sand to enter a settling tank, where it is picked up by well known screw conveyors for transfer to suitable storage.

It has been found, that supposedly well separated sand still contains a high percentage of undesirable aggregates, such as are incapable of passage through a number eight screen and many of these aggregates are spongy and capable of being readily removed by flotation when agitated in a body of water, such as is done in well known rotary hydraulic conveyors. However, the use of such separators has been found unsatisfactory, since they fail to control the entry of the material to the separator under hydraulic influence and during the supposed separation. I have found, that a relatively accurate control of the flow of materials and water to a rotary drum having a foraminous annular wall, with the materials being introduced into the drum adjacent its lower portion, providing the inner annular wall of the drum with transverse baffles to pick up the undesirable aggregates that are separated out as the fine sand passes through the foramina of the drum, conveys the particles upwardly as the drum rotates and through the medium of a relatively high pressure spray device positioned over the top of the drum and directing its spray through the foramina of the drum, washes the particles that are adhering to the baffles and the annular wall, onto a stationary catch pan that is supported in the drum and from which, the flow of water from the spray conducts the particles from the pan into a discharge chute for disposal, while the mason sand so separated through the annular foraminous wall passes into the settling tank beneath the drum and is conveyed to a desirable point by screw conveyors.

2

Details of construction and mode of operation will be more fully set forth in the description which now follows, reference being had to the accompanying drawings, wherein is shown a preferred form of the invention and wherein like characters of reference refer to like parts throughout.

Figure 2:
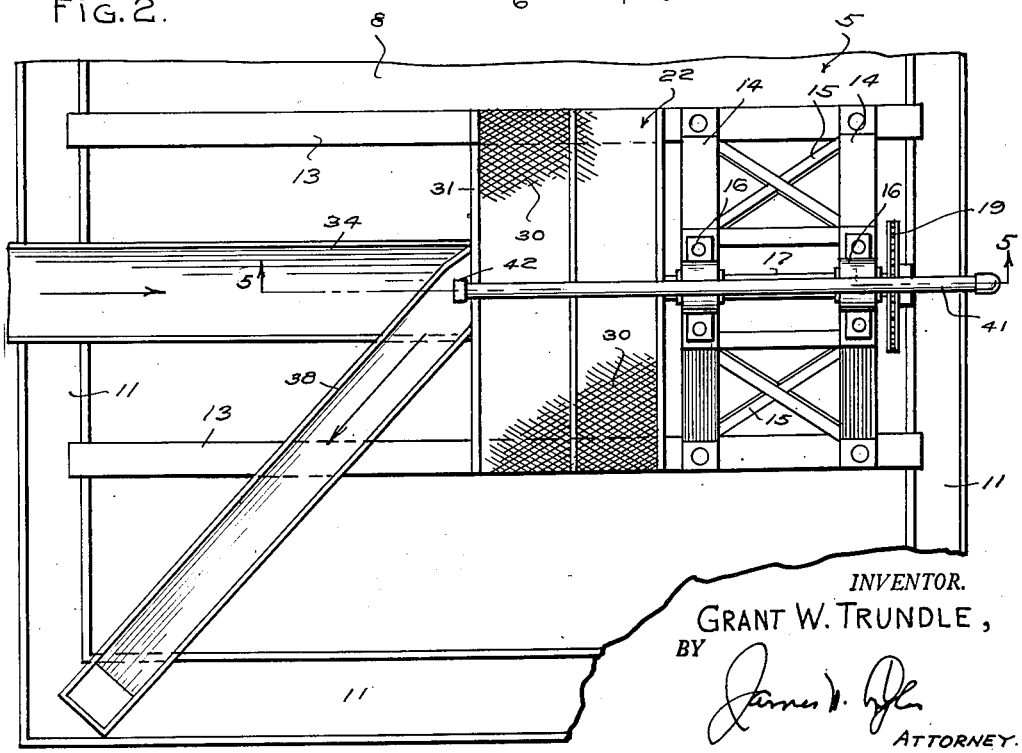

In the drawings:

Figure 1 is a side elevation of a machine constructed in accordance with the invention, Figure 2 is a plan view thereof, Figure 3 is a transverse vertical section, taken on line 3—3 of Figure 1, certain unessential parts broken away for sake of clarity, Figure 4 is a horizontal section taken on line 4—4 of Figure 3, parts omitted for sake of clearness and, Figure 5 is a vertical longitudinal section, taken on line 5—5 of Figure 2.

Referring specifically to the drawings, the numeral 5 designates a conventional settling tank employed in well known hydraulic separators, having an inclined bottom 6, inclined side walls 7 and an open top 8. The tank 5 is provided with shaft bearings 9 at one end for the rotatable support of a pair of screw conveyors 10, parallel to each other and arranged in the bottom of the tank in a manner to efficiently remove all sand that settles in the tank from the separator drum, to be described. The tank 5 obviously receives the water and separated sand from the drum and excess water overflows the open top 8 and spills into weirs 11, arranged around the sides and one end of the tank, below the open upper end. The weirs are inclined toward one corner of the tank, where they are connected to a relatively large diameter take-off pipe 12.

Spanning the top of the tank in parallel relation, are a pair of rigid supporting bars 13, bolted or otherwise rigidly connected to the tank in a horizontal manner. Rigidly bolted to the bars 13, are a pair of spaced upstanding bearing frames 14, braced against twisting, by braces 15. Bolted upon the top of the frames 14, are a pair of aligned journal boxes 16, having a shaft 17 journalled therein for horizontal rotation. The shaft 17 carries at its outer end, a relatively large sprocket 18, driven by a sprocket chain 19, in turn being driven from a relatively small sprocket 20. The sprocket 20 is driven from a prime mover 21, such as an electric motor of the reduction gear type. While the mechanism has been illustrated as being driven through the medium of a sprocket drive, it is obvious, that any form of reduction may be employed, such as a worm and worm wheel drive from the motor 21.

Rigidly supported upon the opposite end of the shaft 17, for turning movement therewith, is a drum, indicated as a whole by the numeral 22. The drum has a closed outer wall 23, see Figure 5, while a suitable stiffener, such as a webbed device 24, is welded or otherwise rigidly connected with the wall 23 and the terminal end of the shaft 17 to prevent any tendency of flexing of the drum with respect to the shaft, in use. The wall is provided with an annular band 25. A parallel ring 26, having a diameter identical to the maximum diameter of the wall 23, is spaced from the wall 23 a predetermined distance and is likewise provided with an annular band 27. The bands 25 and 27 are rigidly connected by a plurality of equidistantly spaced transverse baffles 28, in the form of angle irons. The baffles are preferably welded to the bands and are parallel to each other. A third band 29 is also welded to the baffles intermediate the width of the drum and the several bands detachably support an outer annular cover of foraminous material or wire mesh 30 having predetermined foramina or wire mesh count. In the present instance, it has been found highly satisfactory, to employ a wire mesh, recognized in the industry as number eight. The cover of wire is maintained in position by suitable bands 31. The ring 26 provides a large circular opening 32 in the input side of the drum and this opening is normally covered by a relatively close fitting concentric plate 33. The plate 33 is supported in its closure position against movement, by a materials input trough 34, rigidly positioned with respect to the drum by suitable supports, not shown, while the plate 33 is rigidly attached to the discharge end of the trough 34 in any desirable manner. The plate 33 is provided with a rectangular shaped opening 35, corresponding in size to the open end of the trough, whereby materials traversing the trough under the influence of water, pass into the drum 22, it being understood, that the drum is continuously rotated so long as materials to be separated are being fed thereto. The rotation of the drum, coupled with the turbulence of the water, causes the materials to be highly agitated, with the result, that the lighter or more porous and larger particles are agitated in suspension, while the desirable fine sand, having a higher specific gravity, settles to the bottom of the drum and finally discharges through the mesh wire under the influence of the flow of water, dropping into and settling into the tank 5, where it is subsequently conveyed to a point of storage by the conveyors 10.

Now, since it is imperative that the waste materials separated out, must be disposed of, a catch pan 36, spanning the horizontal opening of the drum to a point equal to the diameter of the opening 32, is rigidly attached to the plate 33 along one edge, while the opposite edge has just sufficient clearance to permit uninterrupted turning movement of the end wall 23 as the drum is rotated. As clearly shown in Figures 3 and 5, the pan 36 is inclined toward the axial center line of the drum from opposite sides and also inclined from end to end toward a common discharge opening 37, formed in the plate 33. The opening 37 communicates with an inclined chute 38, extending diagonally toward one corner of the machine and discharges into the weir 11. The opposite inclined sides of the pan 36 are provided with extension blades 39, adjustable outwardly through the medium of slot and bolt connections 40 with the pan 36. The extensions were found necessary since, the maximum width of the pan could not exceed the diameter of the opening 32 in order that the pan 36 could be moved to position at assembly. The extensions 39 are employed as a means to extend the sides of the pan to a point relatively close to and parallel with the baffles 28, with just sufficient clearance to permit uninterrupted rotative movement of the drum. The extension blades are extended and secured in adjusted position after the plate 33 has been positioned, with the adjustment taking place through the opening 37 or, such assembly and adjustment may be completed before the wire mesh covering is installed. The plate 33 and the pan assembly are securely and rigidly held against shifting by the rigid mounting of the plate 33 and its input trough 34. Arranged over the drum in spaced relation and parallel with the axial line of the drum and its shaft 17, is a water supply line 41, having a closure cap 42 at its terminal end. The line 41 is perforated for a distance equal to the width of the drum as at 43, with the perforation so arranged as to direct a spray of water downward toward the drum. Obviously, this spray passes through the wire mesh and impinges upon the pan 36 and baffles 28, thoroughly washing away any trash or undesirable separated material that has been lifted by the baffles or that has adhered to the inner surface of the drum. This washing carries all such accumulation toward the central opening 37, where it discharges through the chute 38 to the weir 11. A cut-off valve 44 is arranged in the line 41.

In the use of the device, the drum 22 is placed in motion by the prime mover 21, through the medium of the sprocket drive 20, 19 and 18 to the shaft 17. The valve 44 is opened and a force spray is set up from the openings 43 of the line 41. Material to be separated, having been previously screened to a minimum size with the conventional separating mechanism, is directed down the trough 34 with a sufficient volume of water, entering the drum through the opening 35. The rotation of the drum agitates the material and the turbulence of the material in the presence of the flow and simultaneous rotary motion of the drum, causes the particles commonly referred to as trash, to rise or be agitated away from the screen, while the fine sand settles by specific gravity and, under the influence of the water, passes through the mesh of the screen wire 30 to drop into the tank 5 and settles to the bottom of the tank by gravity, where it is concentrated at a point in the bottom of the tank to be removed by the action of the screw conveyors 10. The tank is maintained full of water at all times and the excess water overflows the open top and spills over into the weirs 11, where it is carried by gravity flow to the lowermost corner to discharge through the large take-off pipe 12. The turbulence of the water, due to the rotation of the drum, causes the water to tend to ride partially up the side of the drum before it finally spills through the wire mesh. This turbulence carries with it the undesirable trash or oversize particles of porous or spongy material and such particles are finally picked up by the baffles 28 and ride upon the baffles to a point where they are above the extended blades of the pan 36 and, at this point, they either fall upon the pan, or are washed onto the pan by the force of the spray from the openings 43 and this water from the spray carries the particles or trash to the central opening 37 for discharge down the chute 38 for a final discharge into the weirs 11. The spray 43 maintains the baffles clean and thoroughly cleanses the inner meshes of the wire. As a result of this treatment, the trash and other undesirable matter is entirely removed from the sand, which collects in the tank 5 and is conducted to a storage pile absolutely free of contaminating aggregates. This separator thus produces a mason's sand of a quality that can be used in mortar without the preliminary screening, as is presently being done. Machines heretofore have attempted to produce mason's sand and have so claimed it, but to the best of applicant's belief, none has been successful.

It will thus be seen, that a very efficient and highly desirable machine has been provided. The parts are few and simple, are cheap to manufacture, are strong, durable and employ a principal of separation not heretofore known through the medium of a simple combination of mechanical and hydraulic mechanism whereby the trash is agitated and rises under the turbulent action of the water, due in large measure to the relative buoyancy of the trash over the fine sand.

While a preferred embodiment of the invention has been shown and described, it will be understood, that various changes in the shape, size and arrangement of parts may be resorted to without departing from the spirit of the invention or the scope of the subjoined claims.

Having described my invention, what I claim as new and desire to secure by Letters Patent is:

1. A separator for removing undesirable particles from a fine grade of sand which comprises, a closed cylindrical drum having a foraminous circumferential cover, baffles carried interiorly of said drum, a shaft connected with one closed end of said drum for rotatably supporting the drum in a substantially vertical plane, a non-rotatable closure panel for the other end of said drum, an input trough rigidly supporting said non-rotatable panel and adapted for conveying materials to be separated into the drum in the presence of water, a collector pan rigidly mounted upon said non-rotatable panel and disposed within said drum, a discharge chute extending from said non-rotatable panel and adapted to receive material for discharge from said pan, the rotation of said drum continuously agitating said materials whereby the fine sand is discharged through said foraminous circumferential cover and the heavier particles are collected by said baffles and deposited upon said pan for discharge through said chute, and a fluid conduit associated with said drum for flushing the collected particles from said pan to said discharge chute.

2. The device of claim 1 wherein the collector pan spans the major width of the drum and inclines toward a central opening formed in the non-rotatable panel.

3. The device of claim 2 wherein the collector pan includes extension blades carried at opposed sides of the pan, the said blades being adjustable outwardly to enlarge the surface area of said pan.

GRANT W. TRUNDLE.

REFERENCES CITED

The following references are of record in the file of this patent:

UNITED STATES PATENTS

| Number | Name | Date |
|---|---|---|
| 138,823 | Strawn | May 13, 1873 |
| 480,549 | Boaz | Aug. 9, 1892 |
| 1,318,264 | Carpenter | Oct. 7, 1919 |
| 1,441,870 | Megraw | Jan. 9, 1923 |
| 2,331,135 | Ovestrud | Oct. 5, 1943 |

FOREIGN PATENTS

| Number | Country | Date |
|---|---|---|
| 290,628 | Germany | Mar. 9, 1916 |